United States Patent [19]
Briët

[11] Patent Number: 5,365,398
[45] Date of Patent: Nov. 15, 1994

[54] LIGHTNING PROTECTION SYSTEM
[76] Inventor: Richard Briët, 5661 Citrus Ct., Cypress, Calif. 90630
[21] Appl. No.: 919,598
[22] Filed: Jul. 24, 1992
[51] Int. Cl.$^5$ ............................................. H02H 9/04
[52] U.S. Cl. ................................. 361/117; 361/118
[58] Field of Search ................ 174/2, 4; 361/117, 118
[56] References Cited

U.S. PATENT DOCUMENTS

| | | | |
|---|---|---|---|
| 11,217 | 7/1854 | Forbes | 174/2 |
| 125,716 | 4/1872 | Boyd | 174/2 |
| 196,518 | 10/1877 | Brown | 174/2 |
| 357,050 | 2/1887 | Vail | 174/2 |
| 1,244,118 | 10/1917 | Mullen | 174/2 |
| 1,617,788 | 2/1927 | Baldwin et al. | 361/212 |
| 1,678,539 | 7/1928 | Ticehurst | 174/2 |
| 1,743,526 | 1/1930 | Cage | 174/2 |
| 1,876,577 | 9/1932 | Austin | 361/117 |
| 1,916,335 | 7/1933 | Schaeffer | 174/2 |
| 2,909,589 | 10/1959 | Booker . | |
| 2,927,148 | 3/1960 | Palomino et al. | 361/117 |
| 3,371,144 | 2/1968 | Griscom | 174/2 |
| 3,483,305 | 12/1969 | Bonkowski et al. | 174/2 |
| 3,624,450 | 11/1971 | Graybill | 361/117 |
| 3,919,956 | 11/1975 | Invernizzi | 174/2 |
| 4,180,698 | 12/1979 | Carpenter, Jr. | 174/6 |
| 4,447,847 | 5/1984 | Drulard | 361/117 |
| 4,816,611 | 3/1989 | Invernizzi | 174/6 |
| 5,036,785 | 8/1991 | Kittredge, Jr. et al. | 174/2 |
| 5,043,527 | 8/1991 | Carpenter, Jr. | 174/4 R |

FOREIGN PATENT DOCUMENTS

| | | | |
|---|---|---|---|
| 1515889 | 2/1972 | Germany | H02G 13/00 |
| 1335020 | 10/1973 | United Kingdom | H02G 13/00 |
| 2013998 | 8/1979 | United Kingdom | H02G 13/00 |

OTHER PUBLICATIONS

"NFPA 78 Lightning Protection Code 1989 Edition"; National Fire Protection Association, Quincy, Mass.; cover, pp. 1–4, 8–10, 20–22, 27–29.
"Lightning Protection for Navy 2D2 Site"; J. R. Stahmann, Lightning & Transients Research Institute; title page, contents, pp. 1–9, appendix; 1969.
"Launch Pad Lightning Protection Effectiveness"; J. R. Stahmann, Boeing Aerospace Operations, pp. 31--1-31-12; no date.
"Inside the Cone of Protection"; J. R. Stahmann; PRC Systems Services, pp. 27-1-27-5; no date.
"Lightning and Surge Protection of Large Ground Facilities"; M. F. Stringfellow, Atlanta, Ga.; pp. 328–337; 1988.
"The Feynman Lectures on Physics"; R. P. Feynman et al.; Addison-Wesley Publishing Company; title page, pp. 26-7-26-8; no date.

*Primary Examiner*—Marc S. Hoff
*Assistant Examiner*—S. Jackson
*Attorney, Agent, or Firm*—Sheldon & Mak

[57] ABSTRACT

Disclosed is a lightning attractor apparatus for protecting secondary structures within the lightning protection zone of said lightning attractor apparatus, which is electrically grounded to the body of earth and ground water having reference potential. The apparatus includes a central conductive rod, one or more coaxial cylindrical conductors of decreasing height with the lowest cylindrical conductor on the outside, and a conducting base means onto which all above-ground conductors are rigidly mounted, and which provides the link with a common grounding rod. The grounding rod provides the electrical connection of the apparatus with the reference ground potential. Insulative concentric spacers, located at more or less regular intervals along the axis, separate and isolate the above-ground conductors from one another, their separation being such that arc-over between adjacent conductors are effectively suppressed. An insulating covering for the lower portion of the outer cylindrical conductor provides protection by preventing direct contact with current carrying surfaces when lightning strikes the apparatus. A separately grounded conducting annular ring at the base of the tower, extending typically a few inches above the surface, prevents intercepted lightning currents form leaving the immediate area laterally below the apparatus beyond the perimeter of the ring, thus eliminating step potentials in the region outside the base annular ring. The outside cylindrical conductors provide EMI/RFI shielding for intercepted lightning currents that pass through inside conductors. In one aspect of this invention, one or more cylindrical conductors may be individually grounded to reference ground potential.

19 Claims, 4 Drawing Sheets

LIGHTNING PROTECTION SYSTEM

BACKGROUND

The present invention is directed to lightning protectors, and more particularly to a system for protecting people, structures, and other assets from the hazards associated with lightning.

Lightning protection is needed wherever people or assets are perceived to be threatened by direct lightning strikes. Beginning with the most important one, such assets include people working in open areas, government buildings, conventional and nuclear power plants, military (Army, Navy, and Air Force) and para-military installations, radio and television stations, military and non-military launch sites (rocket installations under military, commercial, NASA, or other control), observatories and satellite tracking stations, churches, storage sites for flammable and/or explosive chemicals, public gathering places (for example open-air stadiums, golf courses), power transmission lines, etc. It is implied and understood that similar needs exist around the globe.

The primary objective of existing lightning protection is to deflect lightning away from structures, people, and assets. This is accomplished in prior art by the installation of one or more grounded lightning rods on tall towers, or on the highest points on buildings, which serve as lightning attractors. The method is based on a false notion that lightning always strikes the highest point in the area, and on the perceived existence of lightning protection zones (LPZ), which are described in many documents, including a standard Lightning Protection Code in the NFPA #78 document, issued by the (U.S.) National Fire Protection Association. Without the benefit of theory, NFPA #78 had been revised several times, to reflect the next best guess of the size and shape for the protection zone.

With safety as a primary objective, a plurality of grounding cables are anchored some distance away from a dielectric support structure underneath the lightning rod in one prior art lightning protection system. This configuration is intended to accomplish two things: (1) to conduct the intercepted lightning current away from work areas, and (2) to cover as many objects under the resulting umbrella-like structure as possible. For example, such a lightning protection system was designed and built by J. R. Stahmann in 1969 for the Navy 2D2 Site in Pinecastle, Fla. This protection system contemplates intercepted lightning currents being divided over a number of grounding wires before being injected into the ground at remote locations for significantly mitigating surface currents and the generation of hazardous step potentials in the work area below the lightning rod. A disadvantage of the multiple-grounded umbrella-like structure is that in fact, the volume of the lightning protection zone is decreased as the grounding wires are spread out. This means that instead of providing more protection to objects beneath the structure, the effect is quite the opposite! It can be shown, for example, that for a two-wire catenoid protection system, an angle of 60 degrees with the vertical eliminates the advantage of using two grounding wires as a way of extending the protection zone beyond that of the single-wire lightning protection system.

U.S. Pat. Nos. 4,180,698 and 5,043,527 to Carpenter, Jr. each disclose yet another variation of the lightning rod. The Carpenter, Jr. patents propose atmospheric ionizers as effective lightning eliminators. A metal brush-like structure is mounted on top of the lightning rod to serve as a source of ions to neutralize charge centers in clouds or elsewhere in the atmosphere. Although the method of discharging a charged body by mounting a sharp needle on it, by giving it sharp edges, or by bringing a grounded sharp needle near the charged body was already discovered some 250 years ago by the original inventor of the lightning rod, Benjamin Franklin (1747), it can be shown that the introduction of atmospheric ionizers may actually aggravate the lightning hazard, rather than eliminate it.

Thus lightning protection devices of the prior art are often ineffective both in preventing direct strikes on structures to be protected and in avoiding harmful surface currents and induced step potentials within nearby work areas. Further, prior art lightning protection devices are not designed to protect sensitive electronic equipment from damage by re-radiated EMI and RFI from down conductors.

Thus there is a need for a lightning protector that will mitigate or eliminate one or more of the following in a single structure:

1. Direct lightning strikes to protected structures;
2. Surface currents and induced step potentials in work areas; and
3. Re-radiated EMI and RFI from down conductors.

SUMMARY

The present invention meets this need by providing a stepped coaxial tower. In one aspect of the invention, the apparatus includes an elongated central conductor having upper and lower extremities; a first tubular conductor having upper and lower extremities; insulative spacing means connecting the tubular conductor in coaxially spaced relation to the central conductor; base means for supporting the central and tubular conductors with the upper extremity of the central conductor projecting above the upper extremity of the tubular conductor; and main grounding means for electrically connecting lower portions of the central conductor and the tubular conductor to a body having ground potential. The body having ground potential is typically a body of earth having ground water therein, and is regarded as a reference ground.

A spaced plurality of openings can be formed in the tubular conductor walls for venting hot gas therefrom. The base means can include a base member for anchoring relative to the ground surface, a bottom extremity of the tubular conductors being rigidly connected to the base member, the central conductor rigidly protruding the base member. The base means can include base portions of each of the central and tubular conductors, the respective base portions being formed for being axially driven into the ground for support thereby, the main grounding means comprising direct electrical contact between the respective base portions and the body having reference ground potential.

At least one of the central and the tubular conductors can be axially segmented for facilitating transport and erection of the apparatus. The apparatus can further include a second tubular conductor supported by the base means and electrically connected to the grounding means, the second tubular conductor being coaxially spaced about a lower portion of the first tubular conductor. The second tubular conductor can have a spaced plurality of openings formed therein for venting hot gas from the apparatus. The tubular conductor can be cylindrical or circular in cross-section. Alternatively, the tubular conductor can be circularly cylindrical.

The apparatus can further include an outer ring conductor, the outer ring conductor being spaced about a lower portion of the first tubular conductor and being electrically isolated therefrom; and outer grounding means for electrically connecting the outer ring conductor to the body having reference ground potential. The outer grounding means can include a vertically oriented conductive rod for electrically connecting the outer ring conductor to the body having reference ground potential. A plurality of the conductive rods can connect spaced locations on the outer ring conductor to the body having reference ground potential. The outer grounding means can include a plurality of conductive members for electrically connecting spaced locations on the outer ring conductor to the main grounding means. An insulating covering can be included for at least a lower portion of the outer ring conductor for protecting assets immediately proximate the apparatus from direct contact with current carrying members thereof. The outer ring conductor can be circular.

In another aspect of the invention, a method for protecting a secondary structure against damage by lightning includes the steps of:

(a) determining a minimum height $\zeta$ from which a lightning strike would likely be damaging to the secondary structure;

(b) determining an ellipsoidal lethal zone (22) shaped according to the relation, $$(h/z_x - 1)^2 + (\rho/\rho_x)^2 = 1$$

where h is the height of a point on the surface of the ellipsoidal zone above the ground, $z_x = \zeta/(1 + \cos \beta)$ and $\rho_x = z_x \sin \beta$, with $\cos \beta = u_o/u_s$, $u_o$ and $u_s$ being the average velocities of lightning propagation in air and in a conducting attractor, respectively;

(c) providing a conductive tower (10), the tower 10 having a height $h_o$ that is not less than $z_x$;

(d) determining a cusped cone of protection (20) as a solid of revolution about the tower 10 when the tower is vertically projecting above level ground, by revolving the lethal zone about the tower, the lethal zone being tangent to the ground 12, touching the tower 10 at a height $z_x$ above the ground;

(e) anchoring the tower 10 to the ground 12 proximate the secondary structure 18' at a location such that the structure 18' extends only within the protection zone 20; and (f) electrically grounding the tower 10 to the reference ground.

DRAWINGS

These and other features, aspects, and advantages of the present invention will become better understood with reference to the following description, appended claims, and accompanying drawings, where:

DESCRIPTION

Figures 1, 2:
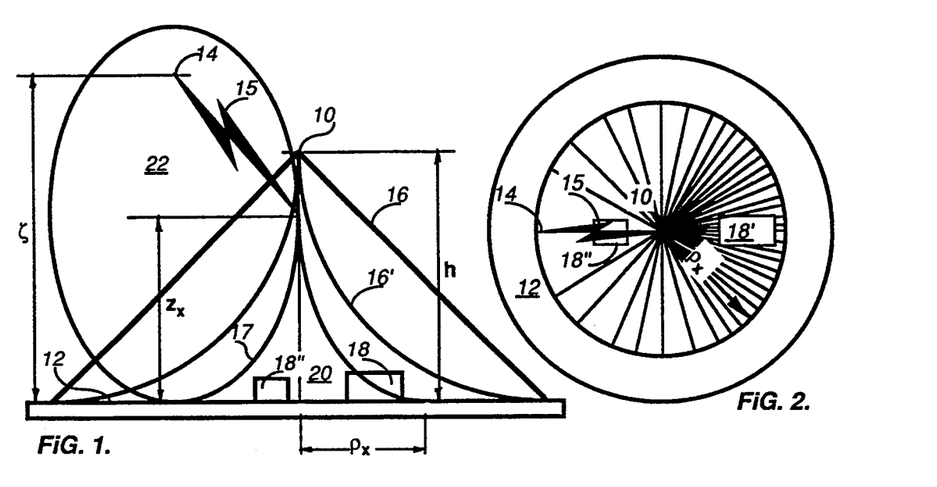
FIG. 1 is an elevational diagram of an upstanding rod protector of the present invention in association with structures to be protected, showing conventional and "rolling ball" prior art zones of protection as compared with a cusped cone of protection in accordance with the present invention.
FIG. 2 is a plan view of the protector of FIG. 1.

The present invention is directed to a stepped coaxial tower for protecting people, structures, and other assets from the hazards associated with lightning. With reference to FIGS. 1 and 2 of the drawings, a conductive lightning attractor or tower 10 projects upwardly to a tower height h above a horizontal plot of ground 12. A source 14 of lightning 15 is located at an altitude $\zeta$ above the ground 12 and at a horizontal distance $\rho_x$ from the tower 10. As shown in FIG. 1, a traditional protection zone 16 is cone-shaped, having an apex half-angle of 45°. A "rolling-ball" protection zone 16', as defined in the Lightning Protection Code in NFPA #78, has a surface of uniform radius r that is tangent to the ground 12 and touches the attractor 10. The radius r is normally 150 feet according to the code, being 100 feet when hazardous or flammable assets are to be protected. FIG. 1 is thus to scale when the height h is 150 feet (or 100 feet for hazardous assets).

Also shown in FIGS. 1 and 2 is a building 18 on the ground 12, within the traditional protection zone 16 and also within the rolling ball zone 16'. The building 18 is shown located on the side of the tower 10 which is opposite from the lightning source 14. Another such structure, designated building 18', is located on the same side of the tower 10 as the source 14. As indicated by the shading in FIG. 2, the tower 10 tends to shield the structure 18 from the lightning source 14 originating at the opposite side of the tower 10.

According to the present invention, it has been determined that neither the traditional protection zone 16 nor the rolling ball zone 16' provide adequate protection for the structure 18 when the lightning source 14 is considered to strike from the same side of the tower 10. A preferred protection zone 20 according to the present invention is bounded by an ellipsoidal lethal zone 22, the lethal zone 22 being an ellipsoid of revolution that is tangent to the tower 10 at a height $z_x$, and to the ground 12 at the horizontal distance $\rho_x$ from the tower 10. The protection zone 20 is thus a cusped cone of revolution, extending upwardly to the height $z_x$ and having a base radius corresponding to the horizontal distance $\rho_x$. The height $z_x$ satisfies the relations $z_x = \zeta/(1 + \cos \beta)$ and $\rho_x = z_x \sin \beta$, with $\cos \beta = u_o/u_s$, $u_o$ and $u_s$ being the average velocities of lightning propagation in air and in the attractor 10, respectively. These velocities are comparable to the speed of light in a vacuum, the velocity of a return stroke being measured in 1935 by Schönland et al. (see Uman, M. A., "Lightning," Dover, 1984, p. 27, Table 2.7) to be between $5.5 \times 10^7$ and $1.6 \times 10^8$ meters per second, $\pm 20\%$. A typical velocity in an attractor is $1.5 \times 10^8$ meters per second. These measurements are consistent with the measurements of Mr. Peek who in the 1920's measured cones of protection with half apex angles varying between 30 and 76 degrees. As discussed more fully below, the size of the lethal zone 22 relates to the height $\zeta$ of the lightning source 14.

As further shown in FIG. 1, the structure 18 extends outside the preferred protection zone 20, indicating that the tower 10 is too far from the structure 18 for protection thereof against a direct strike from the lightning 15. Contrarily, the structure 18' is confined within the protection zone 20, being closer to the tower 10 (and lower) than the structure 18.

According to the present invention it is believed that the shape and dimensions of the preferred protection zone 20 correspond to the lightning 15 following a path of "least time", which path is reflected by the above equations for the lethal zone 22. More particularly, the most likely path that lightning will follow when it travels between a source region and a drain region is the path requiring the least time to traverse. The maximum probability that a given path is followed is proportional to the reciprocal of the minimum time.

Within the context of "relative probability", any member within an ensemble may serve as a standard against which all other members in the ensemble are compared. The act of comparing all members within an ensemble with the chosen "standard" is equivalent to separating the ensemble into three subsets: (1) the set of elements or members of the set with a higher probability than the standard, (2) the set of elements with equal probability, and (3) the set of elements with lesser probability than the chosen standard. In the present invention, these three subsets constitute (1) the lethal zone 22, (2) the boundary region 17 between the lethal zone 22 and the safe or protection zone 20, and (3) the protection zone 20 itself, respectively, where the proper choice for the standard is the probability that lightning strikes the ground in a flat area where no structure stands nearby. The word "nearby" means: "within the critical range, $\rho_x$" which is further explained herein.

Based on this principle, it follows that over flat terrain, the lethal zone 22 is an ellipsoid, which is described by the equation:

$$\left(\frac{h}{z_x} - 1\right)^2 + \left(\frac{\rho}{\rho_x}\right)^2 = 1$$

where $$z_X = \frac{\zeta}{(1 + \cos\beta)}, \cos\beta = \left(\frac{u_o}{u_s}\right), \text{ and } \rho_X = z_X \sin\beta$$

In the above equation, $\rho_x$ and $z_x$ are, respectively, the horizontal and the vertical semi-major axes of the ellipsoidal lethal zone 22; $\zeta$ is the measure of the altitude of the lightning source region above the ground; $\rho$ and h, together, are the horizontal and vertical coordinates of a point on the boundary surface 17 of the lethal zone 22 (in cylindrical coordinates); $u_o$ and $u_s$ are the average velocities of lightning propagation in air and in the structure of the lightning attractor 10 as indicated above. The semi-major axes of the lethal zone, $\rho_x$ and $z_x$, are also called the critical range and the critical height, respectively, because a lightning attractor will have a 50% relative probability of attracting a direct strike, if the source region is at a horizontal distance, $P_x$, from the base of the lightning attractor; and, if a direct strike occurs, then the most likely attachment point will be at the critical height $z_x$ above the base of the attractor as further shown in FIG. 1.

The interaction of lightning with nearby standing structures is characterized by (1): the minimum travel or propagation time between a lightning source and drain region, $\tau_{min}$, (2): the maximum probability that a given path is selected by the lightning stroke, $P_{max}$, and (3): a quantity, herein called the relative probability, or the effectiveness coefficient, $E_{ij}$, which can indicate the effectiveness of a primary structure to provide protection to secondary structures against a direct strike. A "primary structure" is a structure which by design is a primary lightning target. In other words, the lightning attractor 10 is a primary structure. All other nearby structures (including the structure 18') are called "secondary structures" because by design, arrangement, or by any other conceivable technique, lightning is induced to avoid the nearby structures in favor of the primary structure or structures. Accordingly, structures inside the protection zone 20 are secondary structures. In the context of these definitions, "nearby" means "within the critical range, $\rho_x$." Structures outside the critical range are neither "primary", nor "secondary"; they are less likely hit by lightning, simply because they are out-of-reach. This is the connection with the concept of a "striking distance" which is sometimes mentioned in lightning literature. It is believed that the following relationships apply to the tower 10 when oriented vertically above the ground 12, the ground 12 being level:

(1): The minimum propagation time, $\tau_{min}$, is given by:

$$\tau_{min} = \frac{\zeta - z\sin^2\beta}{u_o \cos\beta}$$

(2): The maximum probability that a given path is chosen, $P_{max}$, is given by:

$$P_{max} = \frac{K_B}{\tau_{min}}$$

If "N" is the total number of targets within the critical range (this includes the ground immediately below the source region!), then the normalization constant, $K_B$ is given by:

$$K_B = \left[ \sum_{i=1}^{N} \left( \frac{1}{\tau_{min,i}} \right) \right]^{-1}$$

And finally, (3): the relative probability or the effectiveness coefficient, $E_{ij}$, is given by:

$$E_{ij} = \frac{P_{max,i}}{P_{max,j}} = \frac{\tau_{min,j}}{\tau_{min,i}}$$

where "i", and "j" are index numbers for different lightning targets. When the lightning attractor 10 is provided for protection of nearby structures, the effectiveness of that protection to a secondary structure is quantified by the effectiveness coefficient, $E_{ij}$, where the properly chosen reference target is the lightning attractor, which, by definition, is called the primary structure. It is convenient to define a "decibel-effectiveness", $dBE_{12}$, for quantifying the effectiveness of the attractor 10, given by:

$$dBE_{12} = 20 \times \log(E_{12}) = 20 \times$$

$$\log\left(\frac{P_{max,1}}{P_{max,2}}\right) = 20 \times \log\left(\frac{\tau_{min,2}}{\tau_{min,1}}\right)$$

When the decibel-effectiveness is positive, it can be said that the protection system is effective; when it is zero, it is not effective. When the decibel-effectiveness is negative, the protection system is dangerously defective, even to the extent that the role of the primary and secondary structures are reversed, which means that the secondary structure is hit more likely than the lightning attractor! When this happens, the secondary structure acts as the protector of the primary structure.

Accordingly, the present invention provides a method for protecting secondary structures, like the structure 18', against damage by lightning, including the steps of:

(a) determining a minimum height $\zeta$ from which a lightning strike would likely be damaging to the secondary structure;

(b) determining an ellipsoidal lethal zone (22) shaped according to the relation, $$(h/z_x - 1)^2 + (\rho/\rho_x)^2 = 1$$

where h is the height of a point on the surface of the ellipsoidal zone above the ground, $z_x = \zeta/(1 + \cos \beta)$ and $\rho_x = z_x \sin \beta$, with $\cos = u_o/u_s$, $u_o$ and $u_s$ being the average velocities of lightning propagation in air and in a conducting attractor, respectively;

(c) providing a conductive tower (10), the tower 10 having a height $h_0$ that is not less than $z_x$;

(d) determining a cusped cone of protection (20) as a solid of revolution about the tower 10 when the tower is vertically projecting above level ground, by revolving the lethal zone about the tower, the lethal zone being tangent to the ground 12, touching the tower 10 at a height $z_x$ above the ground;

(e) anchoring the tower 10 to the ground 12 proximate the secondary structure 18' at a location such that the structure 18' extends only within the protection zone 20; and (f) electrically grounding the tower 10 to the reference ground.

Figures 12, 14, 15:
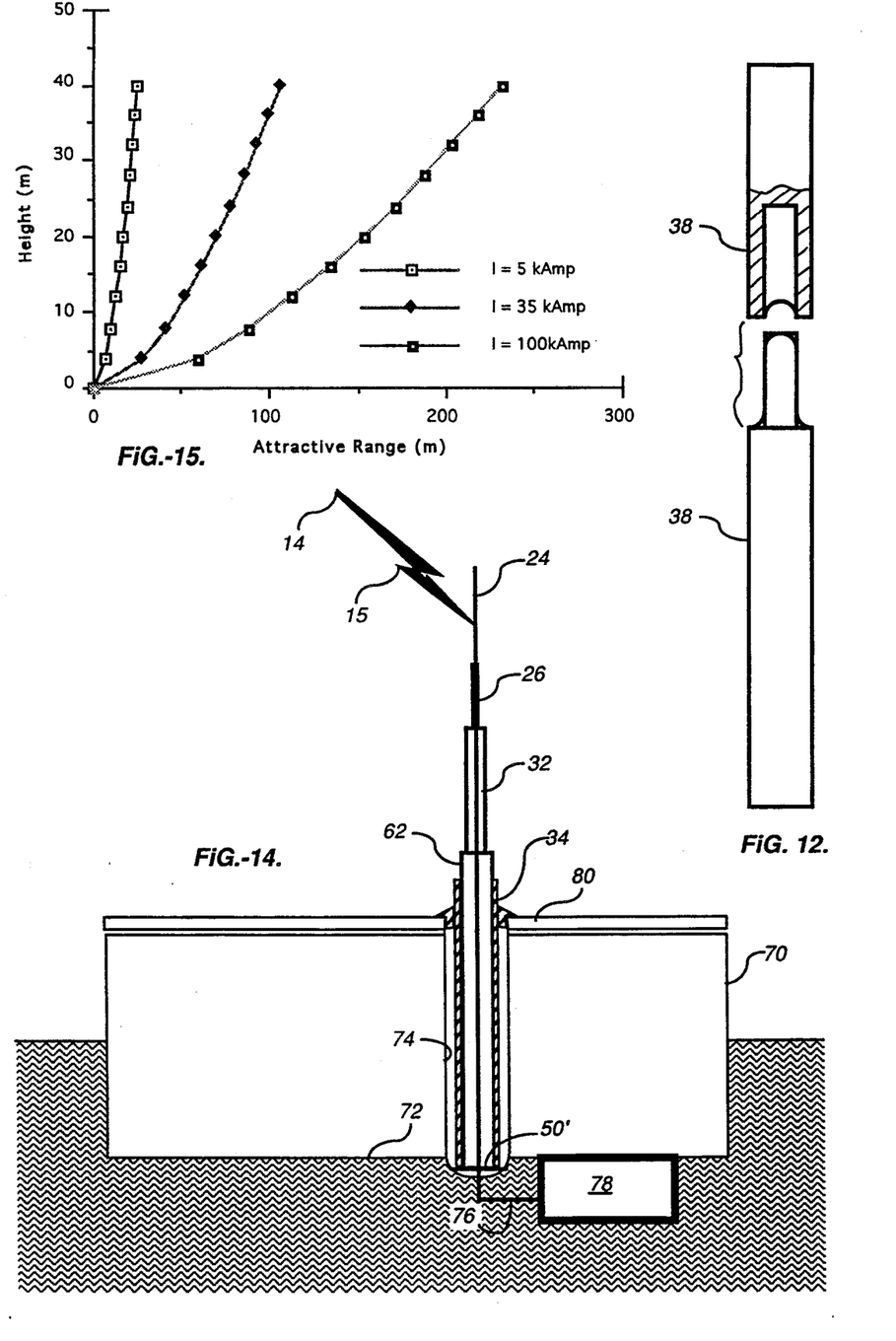
FIG. 12 is an exploded view as in FIG. 11, showing another alternative configuration of the rod portions of FIG. 9.
FIG. 14 is a sectional elevational view showing an alternative configuration of the protector of FIG. 7 installed on a floating platform, such as a vessel.
FIG. 15 is a graph empirically relating tower height to attractive range for the protector of FIG. 1.

Within the lightning community, it is believed that the more powerful strikes originate from higher source regions (See M. F. Stringfellow, "Lightning and Surge Protection of Large Ground Facilities," 1988 International Aerospace and Ground Conference on Lightning and Static Electricity, Apr. 19-22, 1988, Oklahoma City, Okla., and A. J. Eriksson, "An Improved Electro-Geometric Model for Transmission Line Shielding Analysis," IEEE Trans., Vol. PWRD-2, No. 3, Jul. 1987, for example). Eriksson defines an attractive range, designated $R_I$, to be the horizontal distance from an object corresponding to the striking distance, and proposes the formula $R_I = 0.84 H^{0.6} I^{0.74}$, where H corresponds to the tower height h and I is the peak strike current. This equation is strictly empirical, and it lacks the support of a sound theoretical basis. Nevertheless, and with further reference to FIG. 15, a family of plots of "H" versus "$R_I$" provides an approximation for the parameters of the preferred protection zone 20. FIG. 15 shows typical values of $R_I$ according to Eriksson's formula. Eriksson's "attractive range" corresponds to the "critical range" $\rho_x$ as described herein; it is proportional to $z_x$. The critical height $z_x$ is believed to be a quadratic function of the critical range $\rho_x$. Thus, when cast in the form of Eriksson's expression, a theoretical relation is $R_1 = K_E H^{0.5} = \rho_x$, where $K_E = 0.84 \, I^{0.74}$. The modulus, 0.84, in Eriksson's equation can be more precisely determined in accordance with the present invention to be 0.83 for a 45 degree cone. The difference in the power of H (0.5 versus 0.60) is believed to be attributable to experimental and/or arithmetical errors in the curve fitting routine used by Eriksson.

Figures 3, 4, 6:
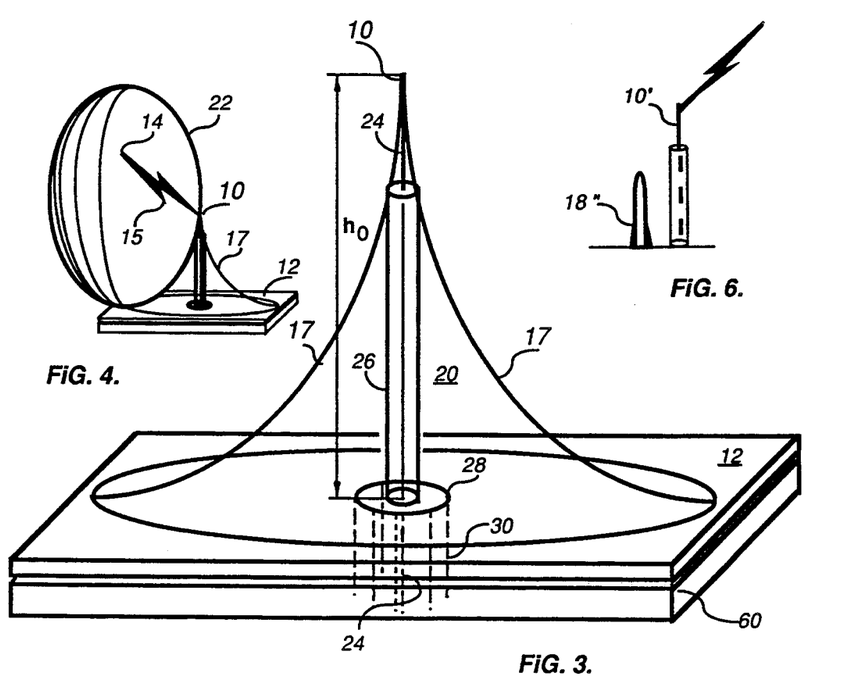
FIG. 3 is an oblique perspective view showing further features of the protector of FIG. 1.
FIG. 4 is an oblique perspective as in FIG. 3, showing a lethal zone bounding the cusped cone of FIG. 1.
FIG. 6 is an elevational view showing an alternative configuration wherein only one of the protectors of FIG. 1 protects the structure of FIG. 5.

In another aspect of the present invention, and with further reference to FIGS. 3 and 4, the attractor 10 preferably has a stepped coaxial configuration that is particularly effective for protecting workers and the like in the vicinity of the attractor 10, and for attenuating the adverse effects of electromagnetic radiation produced by the lightning 15. As shown in FIG. 3, the tower, designated 10', has a central conductive rod 24 that extends within a first cylindrical conductor 26, the rod 24 projecting above the conductor 26 to the height h, designated $h_0$ in FIG. 3, both the rod 24 and the conductor 26 being electrically grounded at the ground 12 by means described below. The tower 10' also has an outer guard ring which typically rises no more than a few inches above the ground, designated ring conductor 28, that is spaced concentrically about the tower 10', the ring conductor 28 being separately grounded by at least one ground rod 30. Preferably there are a plurality of the ground rods 30 for redundancy, and to insure a low-impedance grounding path. FIG. 3 has a three-dimensional representation of the preferred protection zone 20, FIG. 4 also having a three dimensional representation of the ellipsoidal lethal zone 22 associated with the lightning 15 as described above, the cusped cone protection zone 20 being defined by the surface of revolution tangent to the lethal zone 22 between the ground 12 and the tower 10'.

Figures 5, 11, 13:
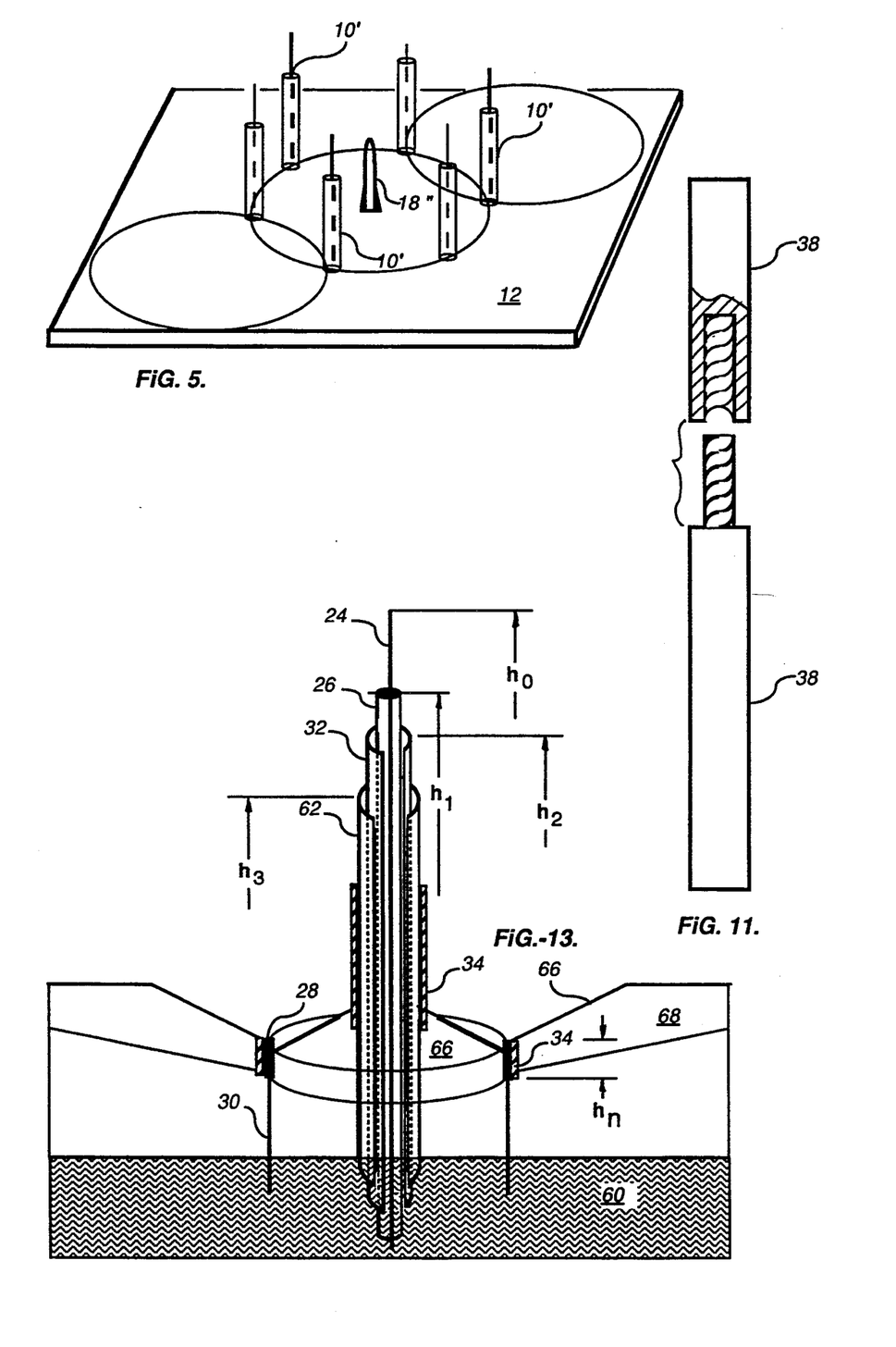
FIG. 5 is an oblique perspective view showing a spaced plurality of the protectors of FIG. 1 protecting a single tall, centrally located structure.
FIG. 11 is an exploded elevational view of an alternative configuration of the rod portions of FIG. 9.
FIG. 13 is an elevational perspective view showing an alternative configuration of the protector of FIG. 7.
Figure 7:
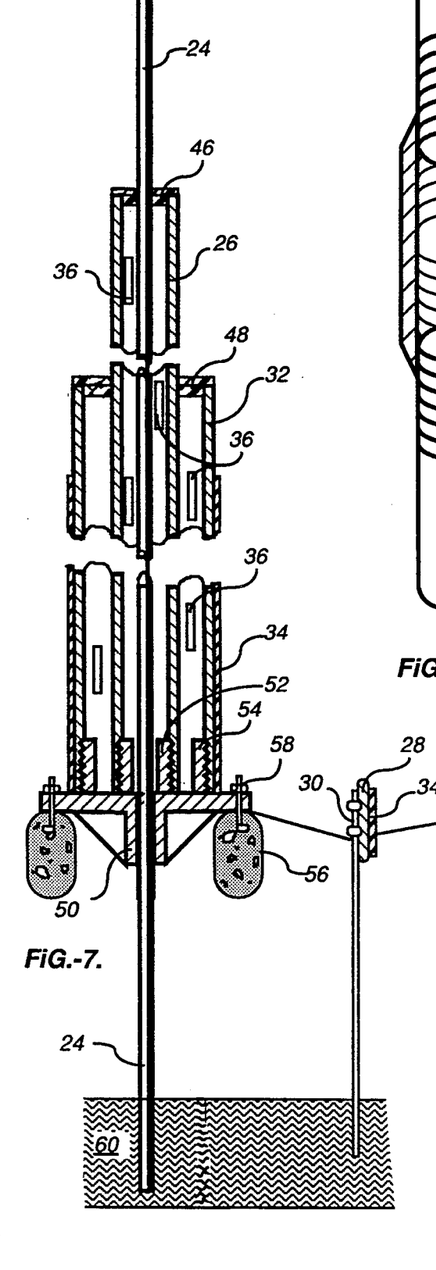
FIG. 7 is a fragmentary sectional elevational view of the protector of FIG. 1.
Figure 8:
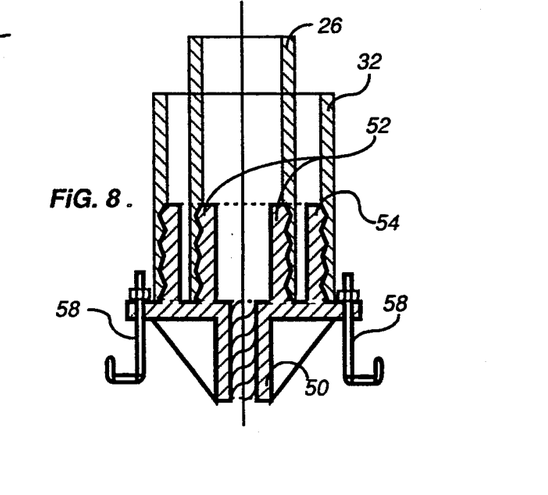
FIG. 8 is a sectional elevational view showing a base portion of the protector of FIG. 7.

With further reference to FIGS. 5 and 6, the secondary structure can be relatively tall as indicated by an upstanding rocket structure 18'', the structure 18'' being on the order of half the height h of the tower 10'. As shown in FIG. 5, a preferred configuration of the present invention has a spaced plurality of the tower 10' in an array surrounding the structure 18''. More particularly, at least three and preferably six of the tower 10', equally spaced, are located equidistant from the structure 18". In this configuration, the boundary of a lethal zone 22 is intercepted by at least one of the attractors 10' before it enters a work area within the array. As shown in FIG. 6, a single one of the attractors 10' is effective for protecting the structure 18" especially against the strongest strikes when located closely adjacent thereto.

With further reference to FIGS. 7-10, a preferred configuration of the attractor 10' has a tubular coaxial second conductor 32 spaced between the conductors 26 and 28, the conductors 26, 32, and 28 having respective heights $h_1$, $h_2$, and $h_n$. It will be understood that the numerical subscripts refer to successive coaxial conductors surrounding the rod 24, n being the number of such conductors, the height of any particular conductor being designated $h_x$, where $h_x$ is less than $h_{x-1}$, x being an index for the stepped structure, $h_1$ being also less than the height $h_0$ of the rod 24 as described above. The rod 24 and each of the coaxial conductors (26, 32, 28, etc) have a substantially uniform outside radius $or_x$, the conductors (26, 32, 28, etc) also having an inside radius $ir_x$. According to the present invention, the current from the lightning 15 is carried downwardly by the attractor from the height $z_x$ to the ground 12 by the rod 24 or the outermost conductor (26, 28 or 32) having the height $h_x$ equal to or greater than $z_x$. Thus the highest (and strongest) strikes are to the rod 24, a significant and predominant portion of the current path in the attractor 10' being shielded by one or more of the coaxial conductors. A direct strike of any damaging magnitude to the outer ring conductor 28 is unlikely in view of the small height $h_n$ thereof. Stronger strikes that are not to the rod 24 are carried by the conductors 26 or 32. The stepped coaxial configuration of the attractor 10' is believed to be advantageously effective for shielding especially the stronger strikes because the striking distance is directly related to the peak strike current as shown in FIG. 15. Accordingly, the attractor 10' of the present invention selectively attracts the more powerful lightning currents onto the taller inside conductors, and the weaker currents onto the shorter outside conductors. The ring conductor 28 prevents intercepted lightning currents from spreading laterally across the ground surface 12, thus inhibiting the build-up of step potentials beyond its outer diameter $or_n$. To suppress arcing between coaxial conductors, it is believed that sufficient space is provided between the rod 24 and the conductors 26 and 32 when adjacent conductors satisfy the relation $ir_n \geq e(or_{n-1})$, e being 2.71828.

Preferably the lower part of the outside surface of the outside coaxial conductor, e.g. 32, has a covering 34 of a suitable insulating material for protecting persons proximate the attractor 10' from electrical shock when such conductor is carrying current from the lightning 15. The covering 34 need not extend higher on the conductor 32 than the portions thereof that can be closely approached by workers or other assets that might be harmed by the current and associated voltage. The covering 34 can be a suitable dielectric coating, or a separately formed coaxial dielectric cylinder that fits closely over the associated conductor 32.

As also shown in FIGS. 5-7 and 10, the coaxial conductors 26 and 32 have slots or openings 36 therein for allowing hot air to escape when a direct strike to the attractor 10' occurs. An exemplary configuration of the openings 36 illustrated in the drawings has a vertically elongated rectangular shape. The potential for the coaxial conductors 26 and 32 to fail when subjected to the pressure of escaping gas is mitigated or even eliminated through proper choice of materials for strength, and by proper selection of the wall thickness of the conductors 26 and 32 and the size and shape of the openings 36.

Figures 9, 10:
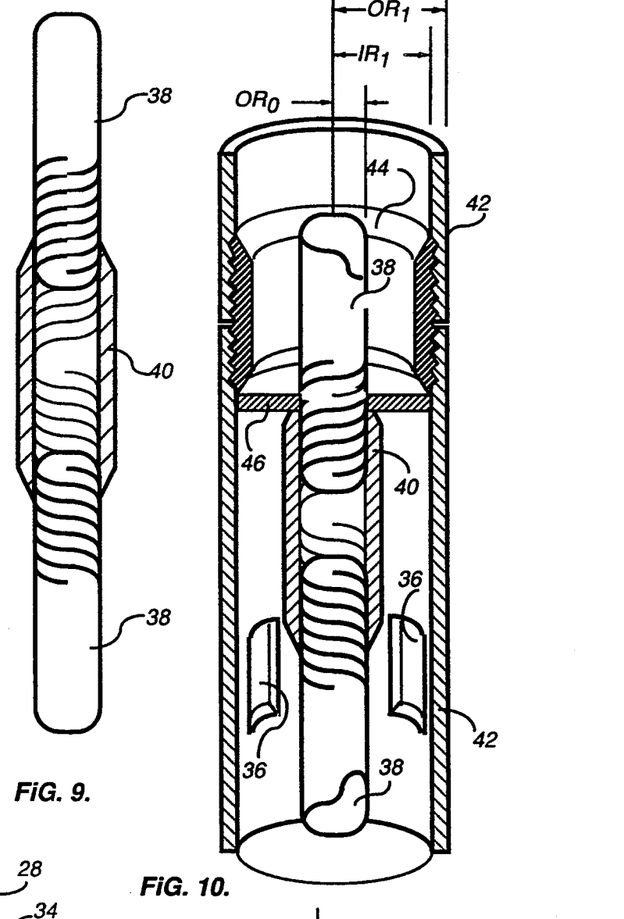
FIG. 9 is a sectional elevational view showing rod segment portions of the protector of FIG. 7 partially exploded.
FIG. 10 is a sectional elevational view showing the rod segment portions of FIG. 9 with surrounding portions of the protector of FIG. 7.

Preferably, and as shown in FIGS. 7-10, the attractor 10' is modularly segmented for ease of transport and erection. More particularly, the rod 24 is made up of a plurality of rod segments 38 that are threadingly joined by respective rod couplings 40 as best shown in FIGS. 9 and 10. The coaxial conductors 26 are similarly formed of conductor segments 42 that are threadingly joined by tubular conductor couplings 44, the couplings 40 and 44 being formed of suitable conductive materials. The first coaxial conductor 26 is spaced from the rod 24 by one or more first coaxial spacers 46, the second conductor 32 being similarly spaced from the conductor 26 by a second coaxial spacer 48, the spacers 46 and 48 being formed of a suitable dielectric material such as glass or ceramic. The rod 24 and the conductors 26 and 32 are electrically and mechanically connected and supported at ground level by a conductive base member 50, the base member 50 having respective upstanding threaded ring portions 52 and 54 for engaging the conductors 26 and 32. The base member 50 is anchored to a foundation 56 using suitable fasteners 58, the rod 24 extending downwardly into the ground 12 below the base 50, preferably as far as a local water table 60 for effectively grounding the base 50.

With further reference to FIG. 11, an alternative configuration of the rod member 24 has counterparts of the segments 38 making direct threaded engagement without using the coupling 40. With further reference to FIG. 12, another alternative configuration of the rod member 24 has other counterparts of the segments 38 making telescoping engagement, also without using the coupling 40. It will be understood that corresponding alternative configurations of the conductor segments 42 are contemplated in the present invention, as well as direct end-to end supportive contact between the conductor segments 42.

With further reference to FIG. 13, an alternative configuration of the attractor 10' has counterparts of the coaxial conductors 26 and 32, and a third coaxial conductor 62 spaced between the second conductor 32 and the ring conductor 28, the conductors 26, 32 and 62 extending a substantial depth into the ground 12, preferably below the water table 60. As further shown in FIG. 13, the ground 12 is graded for sloping downwardly and outwardly toward the outer ring conductor 28 from the third conductor 62 as indicated at 64, and sloping downwardly and inwardly toward the ring conductor 28 as indicated at 66, an upper surface portion 68 of the ground 12 being formed of a suitable porous material for drainage of rain water from the surface of the ground 12. The porous ground portion 68, separately or in combination with the sloping regions 66 and 64, advantageously protects workers and other assets from harmful surface currents and induced step potentials from direct and nearby strikes.

With further reference to FIG. 14, a further configuration of the attractor 10, designated 10", protects a floating vessel 70, the attractor 10" being supported and extending upwardly from a lower hull portion 72 of the vessel 70. From the lower hull portion 72 the attractor 10" extends upwardly within a well cavity 74 of the vessel 72. A ground conductor 76 extends from a counterpart of the base member, designated 50', at the bottom of the well portion 74 to a sacrificial galvanic plate 78 that is mounted external to the vessel 72. A counterpart of the outer ring conductor 28 having the covering 34 extends from the base member 50' to the height $h_n$ relative to a deck portion 80 of the vessel 72, the conductor 28 and the other components of the attractor 10" functioning as described above. The conductor 28, being spaced within the well cavity 74, also advantageously avoids the transmission of high strike currents through structural portions of the vessel 70. If necessary, the well cavity 74 is provided with drainage by a drain pump (not shown) or other suitable means, for maintaining electrical isolation between the attractor 10" and portions of the vessel 70 that are distant from the base 50'.

Although the present invention has been described in considerable detail with reference to certain preferred versions thereof, other versions are possible. For example, the openings 36 can be shaped and spaced for muffling acoustic noise associated with escaping hot air. Also, one or more lightning attractors can be mounted on exterior surfaces of a vessel, thereby avoiding the need of the well cavity 74, while electrical insulation between the attractor 10" and the vessel 70 is maintained. Therefore, the spirit and scope of the appended claims should not necessarily be limited to the description of the preferred versions contained herein.

What is claimed is:

1. A lightning attractor apparatus for protecting secondary structures, the secondary structures being located relative to a body having reference ground potential, the apparatus comprising:
   (a) an elongate central conductor having upper and lower extremities;
   (b) a first tubular conductor having upper and lower extremities, the tubular conductor enclosing a portion of the central conductor;
   (c) insulative spacing means connecting the tubular conductor in coaxially spaced relation to the central conductor;
   (d) base means for supporting the central and tubular conductors with the upper extremity of the central conductor projecting above the upper extremity of the tubular conductor; and
   (e) main grounding means for electrically connecting lower portions of the central conductor and the tubular conductor to the body having reference ground potential.

2. The apparatus of claim 1, wherein a spaced plurality of openings are formed in the first tubular conductor for venting hot gas therefrom.

3. The apparatus of claim 1, wherein the base means comprises a base member for anchoring relative to the ground surface, a bottom extremity of the tubular conductor being rigidly connected to the base member, the central conductor rigidly protruding the base member.

4. The apparatus of claim 1, wherein the base means comprises base portions of each of the central conductor and the tubular conductor, the respective base portions being formed for being axially driven into the ground for support thereby, the main grounding means comprising direct electrical contact between the respective base portions and the body having reference ground potential.

5. The apparatus of claim 1, wherein the central conductor and the tubular conductor are axially segmented for facilitating transport and erection of the apparatus.

6. The apparatus of claim 1, further comprising a second tubular conductor supported by the base means, a lower portion of the second tubular conductor being electrically connected to the grounding means, the second tubular conductor being coaxially spaced about a lower portion of the first tubular conductor.

7. The apparatus of claim 6, wherein the second tubular conductor has a spaced plurality of openings formed therein for venting hot gas from the apparatus.

8. The apparatus of claim 1, wherein the tubular conductor is cylindrical.

9. The apparatus of claim 1, wherein the tubular conductor is circular in cross-section.

10. The apparatus of claim 9, wherein the tubular conductor is circularly cylindrical.

11. The apparatus of claim 1, further comprising:
    (a) an outer ring conductor, the outer ring conductor being spaced about a lower portion of the first tubular conductor and being electrically isolated therefrom; and
    (b) outer grounding means for electrically connecting the ring conductor to the body having reference ground potential.

12. The apparatus of claim 11, wherein the outer grounding means comprises a vertically oriented conductive rod for electrically connecting the outer ring conductor to the body having reference ground potential.

13. The apparatus of claim 12, comprising a plurality of conductive rods connecting spaced locations on the outer ring conductor to the body having reference ground potential.

14. The apparatus of claim 13, wherein the body having reference ground potential is ground water.

15. The apparatus of claim 11, wherein the outer grounding means comprises a plurality of conductive members for electrically connecting spaced locations on the outer ring conductor to the main grounding means.

16. The apparatus of claim 11, further comprising an insulating covering for at least a lower portion of the outer ring conductor for protecting assets immediately proximate the apparatus from direct contact with current carrying members thereof.

17. The apparatus of claim 11, wherein the outer ring conductor is circular.

18. A method for protecting a secondary structure against damage by lightning, including the steps of:
    (a) determining a minimum height $\zeta$ from which a lightning strike would likely be damaging to the secondary structure;
    (b) determining an ellipsoidal lethal zone (22) shaped according to the relation, $$(h/z_x - 1)^2 + (\rho/\rho_x)^2 = 1$$

where h is the height of a point on the surface of the ellipsoidal zone above the ground, $z_x = \zeta/(1+\cos\beta)$ and $\rho_x = z_x \sin\beta$, with $\cos\beta = u_o u_s$, $u_o$ and $u_s$ being the average velocities of lightning propagation in air and in a conducting attractor, respectively;
    (c) providing a conductive tower (10), the tower 10 having a height $h_0$ that is not less than $z_x$;
    (d) determining a cusped cone of protection (20) as a solid of revolution about the tower 10 when the tower is vertically projecting above level ground, by revolving the lethal zone about the tower, the lethal zone being tangent to the ground 12, touching the tower 10 at a height $z_x$ above the ground;

(e) anchoring the tower 10 to the ground 12 proximate the secondary structure 18' at a location such that the structure 18' extends only within the protection zone 20; and (f) electrically grounding the tower 10 to the reference ground.

19. A lightning attractor apparatus for protecting secondary structures, the secondary structures being located relative to a body of earth and ground water having reference ground potential, the apparatus comprising:

(a) an elongate central conductor having upper and lower extremities;

(b) a first cylindrical conductor having upper and lower extremities and surrounding a lower portion of the central conductor, a spaced plurality of openings being formed therein for venting hot gas therefrom;

(c) insulative spacing means connecting the cylindrical conductor in coaxially spaced relation to the central conductor, the conductors being adequately separated to suppress arcing between conductors;

(d) base means for supporting the central and cylindrical conductors with the upper extremity of the central conductor projecting above the upper extremity of the cylindrical conductor;

(e) main grounding means for electrically connecting lower portions of the central conductor and the cylindrical conductor to the body of earth and ground water having reference ground potential;

(f) an outer ring conductor, the outer ring conductor being spaced about a lower portion of the first cylindrical conductor, the conductors being adequately separated to suppress arcing between conductors and being electrically isolated therefrom;

(g) outer grounding means for electrically connecting the outer ring conductor to the body of earth and ground water having reference ground potential, the outer grounding means including a plurality of conductive members for electrically connecting spaced locations on the outer ring conductor to the main grounding means; and (h) an insulating covering for at least a lower portion of at least one of the outer ring conductor and the tubular conductor for protecting assets immediately proximate the apparatus from direct contact with current carrying members thereof.

* * * * *

UNITED STATES PATENT AND TRADEMARK OFFICE
CERTIFICATE OF CORRECTION

PATENT NO. : 5,365,398

DATED : November 15, 1994

INVENTOR(S) : Richard Briët

It is certified that error appears in the above-identified patent and that said Letters Patent is hereby corrected as shown below:

In Drawing Fig. 1, "18'" should be --18"--; in Fig. 2, "18'" should be --18--, and "18""" should be --18'--; in Figs. 3 and 4, "10" should be --10'--; and in Fig. 14, "62" should be --28-- and a designation --10"-- should be added near the figure number with an arrow pointing toward the vertical structure.

In the text at Col. 6, line 20, "$P_x$" should be --$\rho_x$--. Column 8, at lines 36 and 39, "10" should read --10'-- (two places).

Signed and Sealed this

Twelfth Day of March, 1996

*Attest:*

BRUCE LEHMAN

*Attesting Officer*    Commissioner of Patents and Trademarks